US009589473B1

(12) United States Patent
Seo et al.

(10) Patent No.: US 9,589,473 B1
(45) Date of Patent: Mar. 7, 2017

(54) METHOD AND SYSTEM FOR AUTOMATICALLY DISPLAYING FLIGHT PATH, SEEDING PATH AND WEATHER DATA

(71) Applicant: KOREA METEOROLOGICAL ADMINISTRATION, Seoul (KR)

(72) Inventors: Seong Kyu Seo, Seogwipo-si (KR); Seong Ho Son, Seoul (KR); Kyung Yeub Nam, Seoul (KR); Young Kyu Shim, Seoul (KR); Jae Won Jung, Seoul (KR); Chul Kyu Lee, Seoul (KR); Ki Ho Chang, Seogwipo-si (KR); Jin Yim Jeong, Seoul (KR); Ha Young Yang, Seogwipo-si (KR); Sang Hee Chae, Seogwipo-si (KR); Baek Jo Kim, Jeju-si (KR); Kyung Sik Kim, Busan (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 0 days.

(21) Appl. No.: 14/960,304

(22) Filed: Dec. 4, 2015

(30) Foreign Application Priority Data

Nov. 5, 2015 (KR) ........................ 10-2015-0155398

(51) Int. Cl.
*G06F 17/00* (2006.01)
*G08G 5/00* (2006.01)

(52) U.S. Cl.
CPC ........... *G08G 5/0091* (2013.01); *G08G 5/003* (2013.01)

(58) Field of Classification Search
CPC .... G08G 5/0091; G08G 5/003; G08G 5/0082; G08G 5/0021; G08G 9/02;
(Continued)

(56) References Cited

U.S. PATENT DOCUMENTS 5,153,836 A * 10/1992 Fraughton ................ G08G 9/02
340/961
5,714,948 A * 2/1998 Farmakis ............ B60R 25/1025
340/961
(Continued)

FOREIGN PATENT DOCUMENTS

KR 10-1080060 B1 11/2011

OTHER PUBLICATIONS

Smith, Using Real-Time Aircraft Reports of Wind and Environmental Parameters to Enable Dynamic Cockpit-Based Wake Tools, 2011, IEEE, p. O4-01-O4-7.*
(Continued)

*Primary Examiner* — McDieunel Marc
(74) *Attorney, Agent, or Firm* — KED & Associates, LLP

(57) ABSTRACT

Provided are a method and system for automatically displaying a flight path, a seeding path, and weather data, the system including: an experimental scientist terminal transmitting weather data; a pilot terminal; a terrestrial data processing server transmitting wind field observation data concerning a seeding path; and a portable data processing server that receives and stores weather data from the experimental scientist terminal and constitutes a flight path and a seeding path of an experimental airplane, and a current location of the experimental airplane, thereby transmitting information on the constituted flight path, seeding path, and current location to the experimental scientist terminal and the pilot terminal, the portable data processing server resetting the stored seeding path by control of the experimental scientist terminal based on wind field observation data concerning the seeding path, and storing location information of the experimental airplane by control of the experimental scientist terminal.

5 Claims, 6 Drawing Sheets

(58) Field of Classification Search
CPC ............ G01S 7/003; H04W 4/02; B64C 3/14; B64D 43/00; G01H 17/00
USPC .............. 701/3, 14, 120, 301; 340/961, 968; 342/26, 29, 30, 457, 465
See application file for complete search history.

(56) References Cited

U.S. PATENT DOCUMENTS

| | | | | |
|---|---|---|---|---|
| 6,828,922 | B1* | 12/2004 | Gremmert | G01S 7/003 340/949 |
| 7,576,695 | B2* | 8/2009 | Smith | G01H 17/00 342/457 |
| 7,889,133 | B2* | 2/2011 | Smith | G01H 17/00 342/450 |
| 2004/0008253 | A1* | 1/2004 | Monroe | G08B 13/19641 348/143 |
| 2012/0166148 | A1* | 6/2012 | Yoshida | B64C 3/14 703/1 |
| 2014/0024395 | A1* | 1/2014 | Johnson | H04W 4/02 455/456.3 |
| 2014/0081483 | A1* | 3/2014 | Weinmann | G08G 5/0021 701/14 |
| 2014/0188311 | A1* | 7/2014 | Masson | B64D 43/00 701/3 |
| 2016/0275801 | A1* | 9/2016 | Kopardekar | G08G 5/0082 |

OTHER PUBLICATIONS

Domino et al., Air Ground Collaboration Throughdelegated Separation: Results of Simulations Forarrivals to Closelyspaced Parallel Runways, 2011, IEEE, p. M7-1-M7-16.*

Diamandis et al., Broadband Data Services from a HALO Aircraft, 1998, IEEE, p. 9-14.*

Marsh et al., Aerospace Aircraft Information Display System for flight Operations in North Dakota, 2014, IEEE, p. 1-11.*

* cited by examiner

610

710

810

METHOD AND SYSTEM FOR AUTOMATICALLY DISPLAYING FLIGHT PATH, SEEDING PATH AND WEATHER DATA

CROSS-REFERENCE TO RELATED APPLICATION

This application claims priority under 35 U.S.C. §119 to Korean Application No. 10-2015-0155398 filed on Nov. 5, 2015, in the Korean Intellectual Property Office, whose entire disclosure is hereby incorporated by reference.

BACKGROUND OF THE INVENTION

Field of the Invention

Embodiments of the present invention relate to systems for automatically displaying flight paths, seeding paths, and weather data using satellite communications and websites for aviation experiments of artificial rainfall, and more particularly, to a method and system for automatically displaying a flight path, a seeding path, and weather data using satellite communications and websites for the smooth experimental operation of aviation experiments for artificial rainfall.

Description of the Related Arts

Artificial rainfall refers to a technique for artificially inducing or increasing precipitation or making it rain in a specific region in advance by artificially promoting the development of the clouds using cloud seeding severing ice nuclei or condensation nuclei in the clouds which are not developed due to praecipitatio. An artificial rainfall aviation experiment refers to an experiment for directly seeding artificial cloud seeds from a cloud base, a cloud middle, a cloud top of the target cloud using an airplane.

In general, such an experiment has been mainly carried out in the summertime and the wintertime. In the summertime, seeding is carried out with $CaCl_2$ that serves as condensation nuclei in a cloud base of cumulus clouds having above-zero temperature, and in the wintertime, seeding is carried out with AgI that serves as ice nuclei in a cloud top and a cloud middle of a stratocumulus or cumulus clouds having below zero temperature.

When an artificial rainfall aviation experiment is carried out, based on weather information of an area targeted for the experiment before takeoff of an airplane, a manager in charge of the aviation experiment prepares plans a flight path for aerial observation of movement of an experimental airplane to the target area, and surroundings of the target area, and a seeding path for seeding cloud seeds in the clouds.

After planning, the manager inputs location information of stops of the airplane in an aviation GPS, and a pilot or an experimental scientist who boards the airplane has a fly while monitoring an order of stops when flying.

However, such a conventional art is problematic in that it is difficult to change a flight path after the airplane takes off. In practice, since it takes 1 hour or more for the airplane to take off from an airport and to reach an experimental area after the experimental design is completed and the experiment is ready, a weather condition at the time of the experimental design may be different from a weather condition when the airplane reaches an altitude of the target area. Thus, although cloud seeding is performed in the clouds, it may not have an influence on the target area due to a wind field changed from that upon the experiment.

In order to improve accuracy of the artificial rainfall aviation experiment and a seeding effect, basic study on the theory of cloud physics and an algorithm for determining seeding lines are important, but an operation system for smoothly carrying out the experiment by properly applying the theory and the algorithm is also needed. Thus, it has been required to develop equipment and a system, that are configured such that location information of points necessary for flying, and flying paths are displayed to be easily identified by pilots and experimental scientists through an experimental design, and real-time weather data concerning the altitude of a target area is secured so that a design can be changed even in a dangling airplane.

Meanwhile, an example of a conventional art related thereto includes Korean Patent No. 10-1080060 (entitled 'Seeding and Verification Method for Targeted Cloud Seeding for Artificially Inducing Snow or Precipitation' and granted on Oct. 31, 2011).

SUMMARY OF THE INVENTION

Accordingly, embodiments of the present invention have been devised in order to solve the problems. An aspect of embodiments of the present invention provides a method and system for automatically displaying a flight path, a seeding path, and weather data, that are configured such that location information of stops is input by an experimental design of a manager in charge of an experiment so that information on a flight path of an experimental airplane and pre-stored information on a restricted airspace are provided to a pilot and an experimental scientist in a map form through their terminals; real-time flying position is displayed via a GPS; and information on a real flight path of the experimental airplane is stored so as to be fed back after completion of the experiment.

Another aspect of the present invention also provides a method and system for automatically displaying a flight path, a seeding path, and weather data, that are configured such that as a seeding line decision algorithm is applied, real-time weather information exchange with a terrestrial observer can be performed using satellite communications; a flight path and a seeding path can be displayed and changed by inputting information on a wind direction, a wind velocity, or the like using a simple touch in the experimental airplane; and when observation data and numerical weather prediction data in a designated form are input, the data can be displayed on a screen so that an artificial rainfall aviation experiment can be performed by flexibly coping with a meteorological change, and accuracy of the experiment can be also improved, thereby enabling an increase in an experimental effect.

In order to solve the above problems, according to an aspect of embodiments of the present invention, a system for automatically displaying a flight path, a seeding path, and weather data includes: an experimental scientist terminal transmitting weather data; a pilot terminal; a terrestrial data processing server transmitting wind field observation data concerning a seeding path; and a portable data processing server that receives and stores weather data from the experimental scientist terminal and constitutes a flight path and a seeding path of an experimental airplane, and a current location of the experimental airplane, thereby transmitting information on the constituted flight path, seeding path, and current location to the experimental scientist terminal and the pilot terminal, the portable data processing server resetting the stored seeding path by control of the experimental scientist terminal based on wind field observation data concerning the seeding path received from the terrestrial data processing server, and the portable data processing server storing location information of the experimental airplane by control of the experimental scientist terminal, wherein the experimental scientist terminal and the pilot terminal display, on a map, the weather data stored in the portable data processing server, and the flight path, the seeding path and the current location of the experimental airplane.

According to another embodiment of the present invention, the system may further include a GPS gateway indicating the current location of the experimental airplane, wherein the portable data processing server may receive information on the current location of the experimental airplane from the GPS gateway.

According to still another embodiment of the present invention, the system may further include: a satellite signal transmitter receiving location information of the experimental airplane from a GPS satellite and transmitting the location information; a satellite signal receiver receiving the location information of the experimental airplane; and an active Wi-Fi antenna control unit (Active Wifi ACU) controlling rotation of an antenna based on the location information of the experimental airplane received from the satellite signal receiver, wherein the terrestrial data processing server may transmit wind field observation data concerning the seeding path via the antenna controlled by the active Wi-Fi antenna control unit.

According to another aspect of embodiments of the present invention, a method for automatically displaying a flight path, a seeding path, and weather data, the method includes: storing, by an experimental scientist terminal, weather data in a portable data processing server; constituting, by the portable data processing server, a flight path and a seeding path of an experimental airplane, and a current location of the experimental airplane on a map; displaying, by the experimental scientist terminal and the pilot terminal, the weather data, and information on the flight path and the seeding path of the experimental airplane, and the current location of the experimental airplane that are stored in the portable data processing server; receiving, by the portable data processing server, wind field observation data concerning the seeding path from the terrestrial data processing server; resetting, by the experimental scientist terminal, the seeding path stored in the portable data processing server based on the wind field observation data received from the portable data processing server; and storing, by the experimental scientist terminal, location information on the experimental airplane in the portable data processing server.

In addition, according to still another embodiment of the present invention, the receiving of wind field observation data may further include: receiving, by a satellite signal transmitter, the location information of the experimental airplane from a GPS satellite, and transmitting the location information; receiving, by a satellite signal receiver, the location information of the experimental airplane; controlling, by an active Wi-Fi antenna control unit (Active Wifi ACU), rotation of an antenna based on the location information of the experimental airplane received from the satellite signal receiver; and transmitting, by the terrestrial data processing server, wind field observation data concerning the seeding path using the antenna controlled by the active Wi-Fi antenna control unit.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

Figure 1:
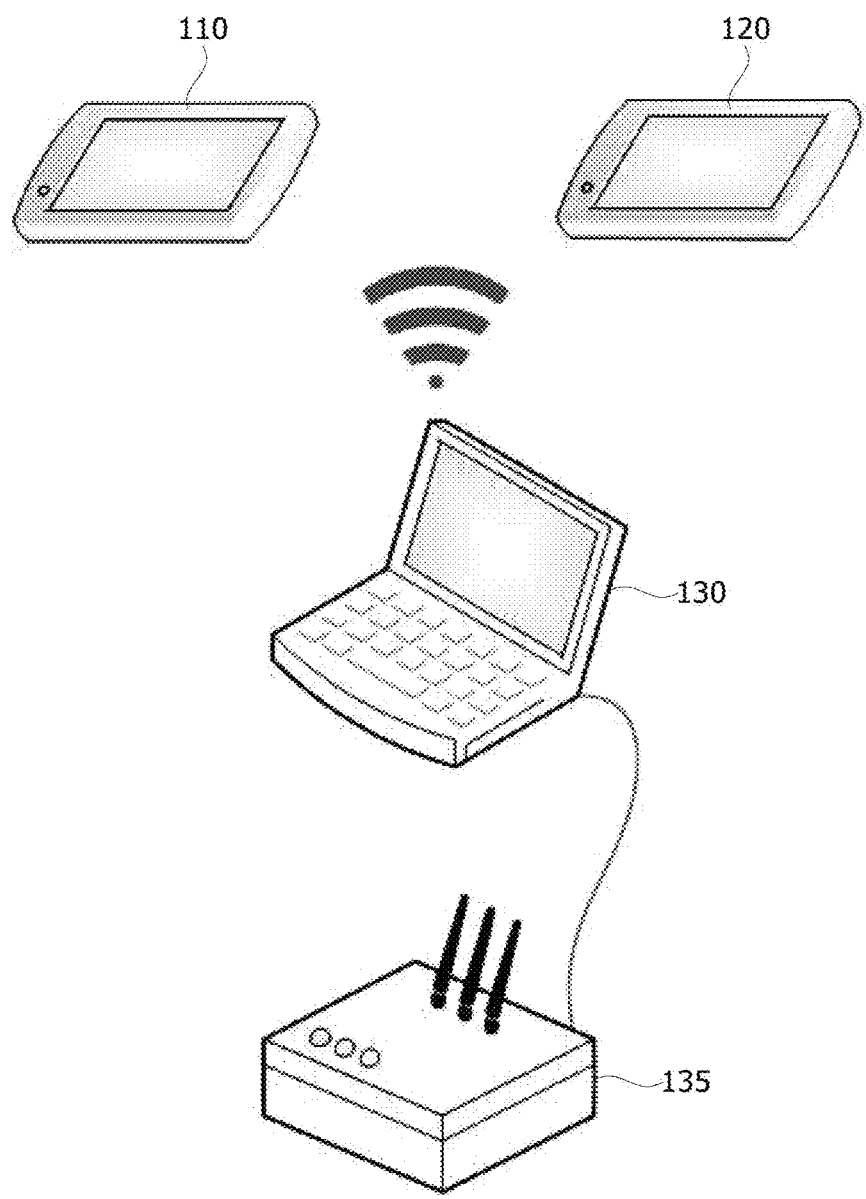
FIGS. 1 and 2 are views illustrating a system for automatically displaying a flight path, a seeding path, and weather data according to an embodiment of the present invention.

Hereinafter, embodiments of the present invention will be described in detail with reference to the accompanying drawings in such a manner that the present could be easily implemented by those having ordinary skill in the art to which the present invent pertains. The present invention may, however, be embodied in different forms and should not be construed as limited to the embodiments set forth herein. In the following description, it is to be noted that, when the functions of conventional elements and the detailed description of elements related with the present invention may make the gist of the present invention unclear, a detailed description of those elements will be omitted. Also, it should be understood that the shape and size of the elements shown in the drawings may be exaggeratedly drawn to provide an easily understood description of the structure of the present invention. As used herein, the singular forms "a," "an" and "the" are intended to include the plural forms as well, unless the context clearly indicates otherwise.

Figure 2:
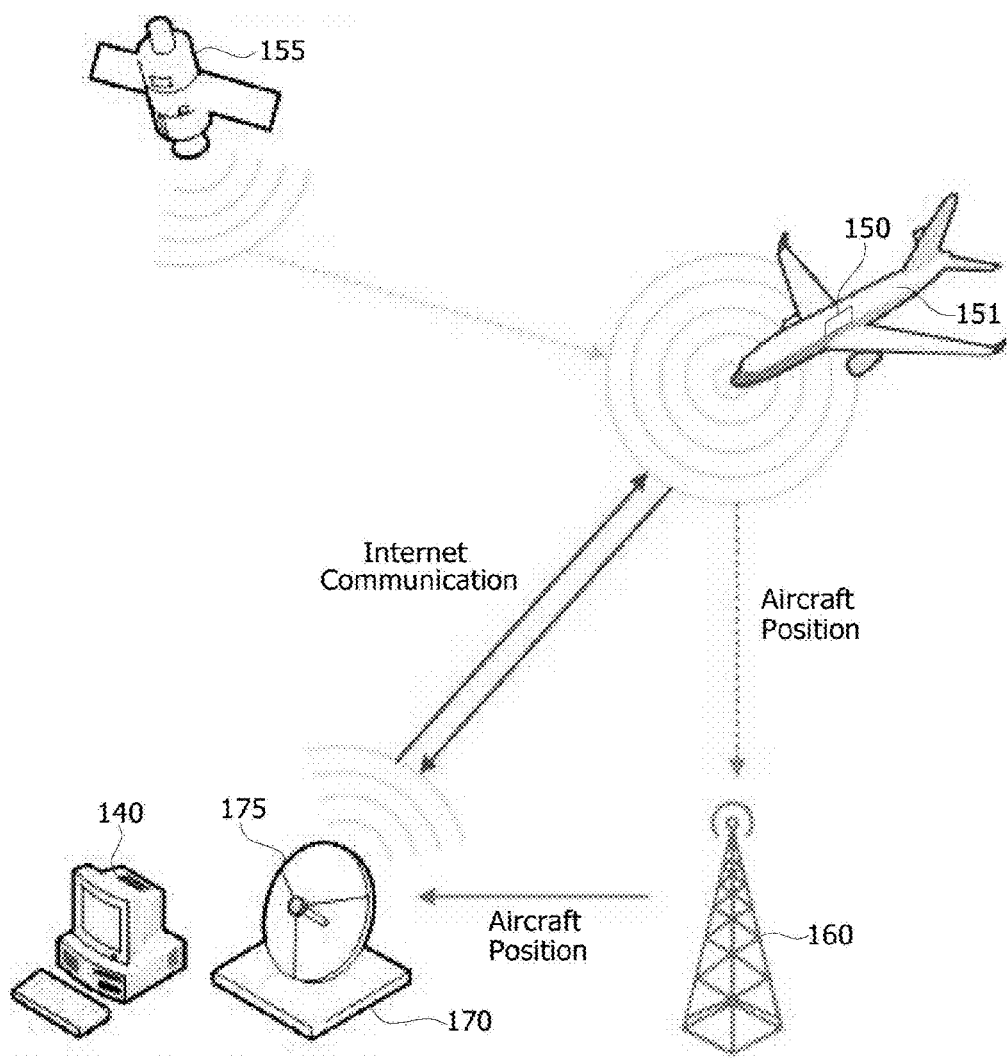

FIGS. 1 and 2 are views illustrating a system for automatically displaying a flight path, a seeding path, and weather data according to an embodiment of the present invention.

A system for automatically displaying a flight path, a seeding path, and weather data according to the embodiment of the present invention will be hereinafter described with reference to FIGS. 1 and 2.

As illustrated in FIGS. 1 and 2, the system for automatically displaying a flight path, a seeding path, and weather data according to the embodiment of the present invention may include: an experimental scientist terminal 110; a pilot terminal 120; a portable data processing server 130; a GPS gateway 135; a terrestrial data processing server 140; a satellite signal transmitter 150; a satellite signal receiver 160; and an active Wi-Fi antenna control unit (ACU) 170.

Before an experimental airplane 151 takes off, the experimental scientist terminal 110, the pilot terminal 120, the portable data processing server 130 and the GPS gateway 135 are turned on.

The portable data processing server 130 and the GPS gateway 135 are connected to each other via a LAN cable. In addition, the experimental scientist terminal 110, the pilot terminal 120, and the portable data processing server 130 may be connected to a rainmaker via Wi-Fi.

The experimental scientist terminal 110 may transmit weather data to the portable data processing server 130, and the portable data processing server 130 may store the weather data. To do so, the experimental scientist terminal 110 may transmit an experimental scientist's login information to the portable data processing server 130 so that the experimental scientist can log on. The experimental scientist terminal may transmit numerical weather prediction data (KLAPS), automatic weather system (AWS) data, aerological observation data, or a weather chart to the portable data processing server 130 so that the weather data can be stored in the portable data processing server.

The portable data processing server 130 may constitute a flight path and a seeding path of the experimental airplane 151, and a current position of experimental airplane 151 on a map. The experimental scientist terminal 110 and the pilot terminal 120 may receive and display information about the weather data stored in the portable data processing server 130, and the flight path and the seeding path of the experimental airplane, and a current position of experimental airplane on the map.

Accordingly, the experimental scientist and a pilot of the experimental airplane 151 may confirm whether or not the stored data is normally displayed through each web browser of the experimental scientist terminal 110 and the pilot terminal 120. The pilot may check whether or not GPS information of the experimental airplane 151 received through the GPS gateway 135 is normally displayed, and may identify a flight path after takeoff of the experimental airplane 151, and a real-time location of experimental airplane 151.

In addition, the portable data processing server 130 may receive wind field observation data concerning the seeding path from the terrestrial data processing server 140.

In this case, as illustrated in FIG. 2, the terrestrial data processing server 140 may transmit the wind field observation data concerning the seeding path to the portable data processing server 130 via an antenna 175 controlled by the active Wi-Fi antenna control unit 170.

In greater detail, the satellite signal transmitter 150 installed in the experimental airplane 151 may receive location information of the experimental airplane 151 from a GPS satellite 155 and may then transmit the received location information to the satellite signal receiver. The satellite signal receiver 160 may receive the location information of the experimental airplane 151 from the satellite signal transmitter 150. Accordingly, the active Wi-Fi antenna control unit 170 may control rotation of the antenna 175 based on the location information of the experimental airplane 151 received from the satellite signal receiver 160.

Also, when the data before takeoff of the airplane is different from current data, the experimental scientist terminal 110 may reset the seeding path stored in the portable data processing server 130 based on the wind field observation data received from the portable data processing server 130.

That is, the experimental scientist may reset the seeding path stored in the portable data processing server 130 through the experimental scientist terminal 110 by re-storing wind field data. The experimental scientist and the pilot of the experimental airplane 151 may carry out an aviation experiment by identifying the seeding path that is reset by the experimental scientist terminal 110 and the pilot terminal 120.

In addition, the experimental scientist terminal 110 may store the location information of the experimental airplane 151 in the portable data processing server 130. In detail, the experimental scientist may store the location information of the experimental airplane 151 at 1 second intervals and at intervals of 10 times per second using the experimental scientist terminal 110 so that the location information of the experimental airplane 151 can be more accurately stored, thereby enabling the location information to be used upon conducting post analysis of the aviation experiment.

FIGS. 3 to 7 are views for explaining a method for automatically displaying a flight path, a seeding path, and weather data according to an embodiment of the present invention.

The method for automatically displaying a flight path, a seeding path, and weather data according to the embodiment will be hereinafter described with reference to FIGS. 3 to 7.

Figure 3:
FIGS. 3 to 8 are views for explaining a method for automatically displaying a flight path, a seeding path, and weather data according to an embodiment of the present invention.

FIG. 3 illustrates a flight path, a seeding path, location information of the experimental airplane, and weather data on the map that are displayed by each web browser of the experimental scientist terminal 110 and the pilot terminal 120

The experimental scientist terminal 110 may transmit the weather data to the portable data processing server 130, and the portable data processing server 130 may store the weather data.

Then, the portable data processing server 130 may constitute the flight path, the seeding path, and a current location of the experimental airplane 151 on the map. The experimental scientist terminal 110 and the pilot terminal 120 may display the weather data stored in the portable data processing server 130, the flight path and the seeding path of the experimental airplane, and the current location of the experimental airplane on the map.

As illustrated in FIG. 3, the web browser may display the map on which a flight path 310 from an airport, from which the experimental airplane takes off, to a seeding line, a seeding path 320 from a first seedling line to a last seeding line, a target area 330, a current location 340 of the experimental airplane, short-term numerical weather prediction data 350 such as a temperature of an altitude of 1.5 km, a wind field, or the like, terrestrial AWS (automatic Weather System) data 360 such as a terrestrial wind field or the like are displayed.

The map may be enlarged and reduced and may enable a full path from a takeoff point to a target area to be identified at a glance through a separate window. In addition, radiosonde data or other aerological data may be also displayed on the map by storing and processing the data as a file in a format designated to an input folder of the portable data processing server 130.

Accordingly, the experimental scientist and the pilot of the experimental airplane 151 may check whether or not the input data is normally displayed by each web browser of the experimental scientist terminal 110 and the pilot terminal 120. The pilot may check whether or not GPS information of the experimental airplane 151 received through the GPS gateway 135 is normally displayed, and may identify a flight path after takeoff of the experimental airplane 151, and a real-time location of the experimental airplane 151.

Furthermore, the portable data processing server 130 may receive wind field observation data concerning the seeding path from the terrestrial data processing server 140. The terrestrial data processing server 140 may transmit the wind field observation data concerning the seeding path to the portable data processing server 130 through the antenna 175 controlled by the active Wi-Fi antenna control unit 170.

In this case, the satellite signal transmitter 150 installed at the experimental airplane 151 may receive location information of the experimental airplane 151 from the GPS satellite 155 and may transmit the location information to the satellite signal receiver. The satellite signal receiver 160 may receive the location information of the experimental airplane 151 from the satellite signal transmitter 150. Accordingly, the active Wi-Fi antenna control unit 170 may control rotation of the antenna 175 based on the location information of the experimental airplane 151 received from the satellite signal receiver 160.

Meanwhile, when the data before takeoff of the airplane is different from current data, the experimental scientist terminal 110 may reset the seeding path stored in the portable data processing server 130 based on the wind field observation data received from the portable data processing server 130.

Figure 4:
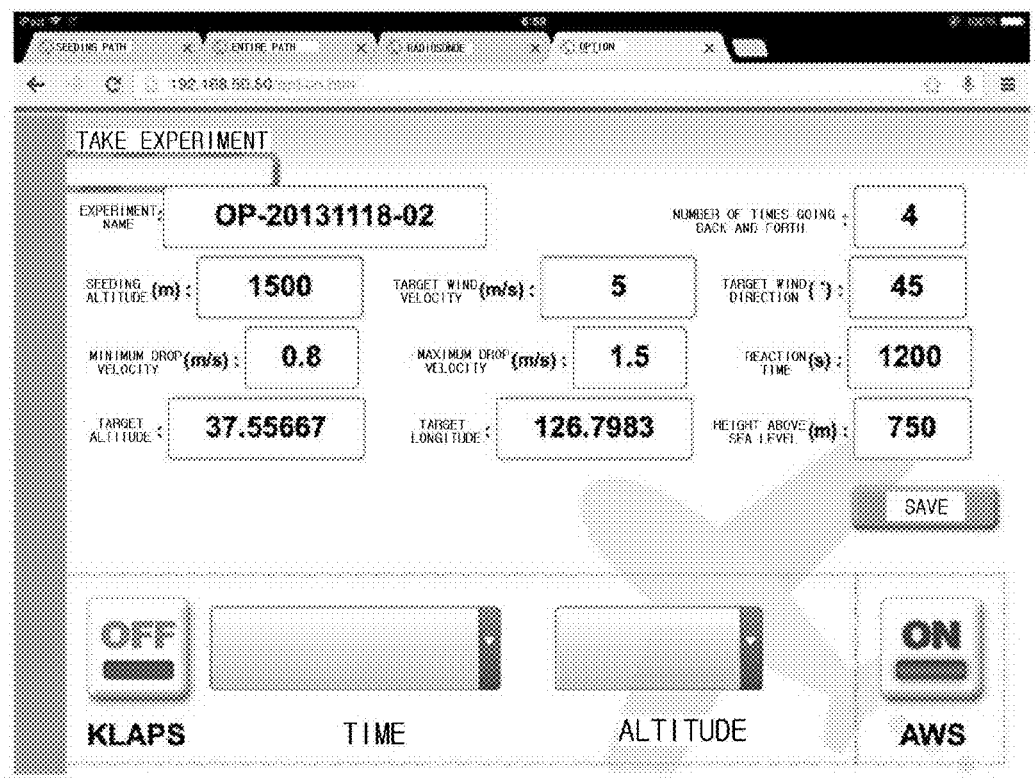

As illustrated in FIG. 4, the experimental scientist may receive, through the experimental scientist terminal 110, information received from the terrestrial data processing server 140 to the portable data processing server 130 in a web browser form, and may reset the flight path, the seeding path, and the target area via an option window.

In this case, the seeding path may be constituted by improving and applying a seeding line decision algorithm that is suitable for ground truth. Thus, displayed is the seeding path which is constituted such that a distance between a target area and a seedling line, and a direction of the seeding line are changed according to a change in variable, such as a seeding altitude, a target wind velocity, a target wind direction, a minimum drop velocity, a maximum drop velocity, a reaction time, a height above sea level of a target area, or the like, and that the number of seeding lines from a first seeding line to a last seeding line is determined according to the number of times the airplane going back and forth.

In addition, the experimental scientist terminal 110 may store the location information of the experimental airplane 151 in the portable data processing server 130 so that the location information can be used upon post analysis of an aviation experiment.

Figure 5:
Figure 6:
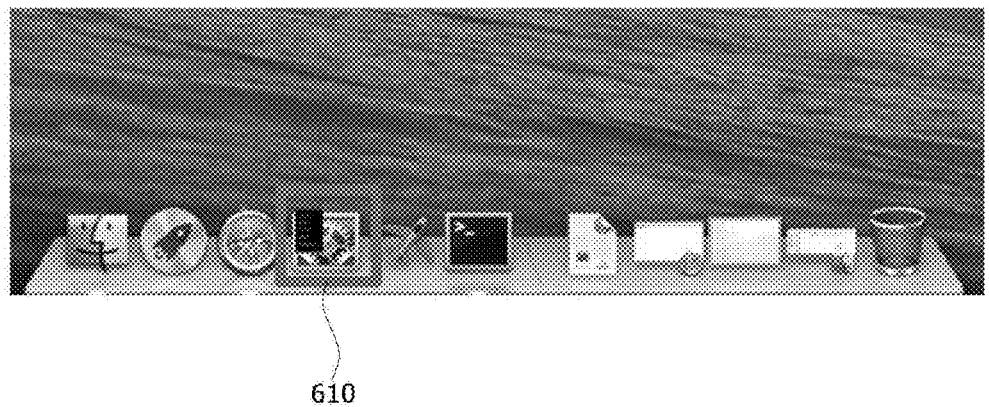
Figure 7:
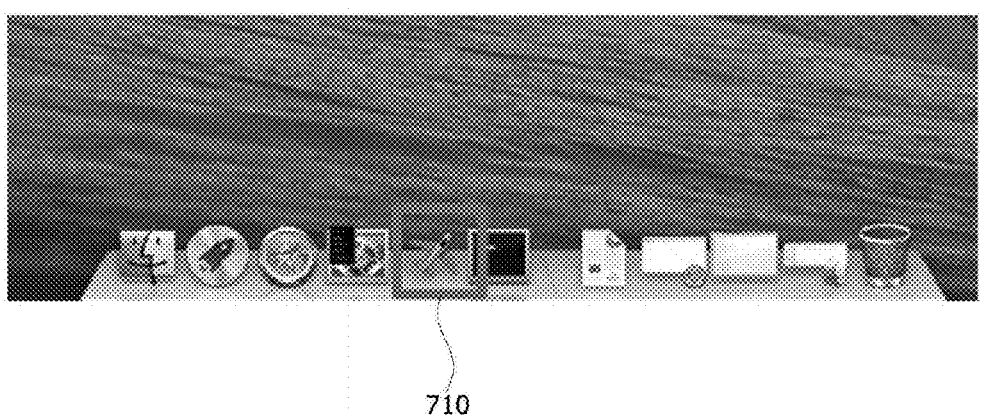
Figure 8:
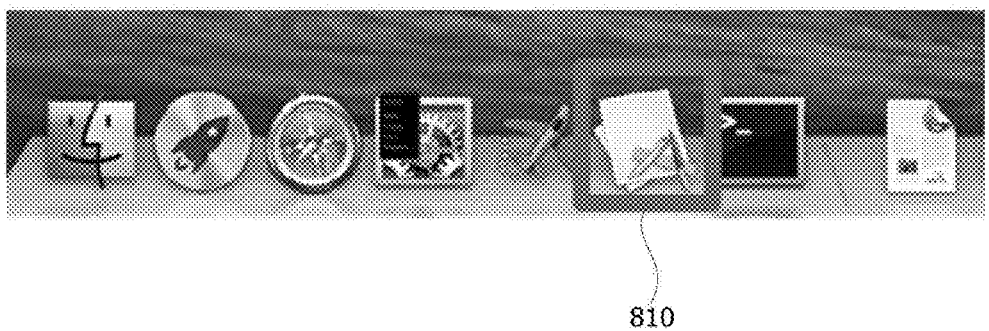

FIG. 5 is a view illustrating a directory structure of the portable data processing server according to an embodiment of the present invention, and FIGS. 6 to 8 are views illustrating a control icon of the system for automatically displaying a flight path, a seeding path, and weather data according to an embodiment of the present invention, the control icon being provided to the experimental scientist terminal or the pilot terminal.

As illustrated in FIG. 5, the portable data processing server may include: a folder in which weather data to be processed is stored (DAIN); a folder in which processed weather data is stored (DAOU); an execution module storage folder (EXEC); a main information storage folder (INFO); a folder in which various log files are stored (LOG); a referential data storage folder (REF); an execution script storage folder (SHEL); a program source storage folder (SRC); a temporary data storage folder (TMP); and another temporary data storage folder (WWW).

In addition, as illustrated in FIGS. 6 to 8, the portable data processing server may provide an icon so that the experimental scientist and the pilot can easily control the data without inputting a separate execution command through the experimental scientist terminal and the pilot terminal.

FIG. 6 illustrates a data processing execution icon 610, FIG. 7 illustrates an execution icon 710 for enabling a current location of the experimental air plane to be displayed and stored via a GPS on a map on which the flight path and the seeding path are displayed, and FIG. 8 illustrates an icon 810 for enabling GPS tracking data of the airplane collected during an aviation experiment to be stored in a KML file after completion of the aviation experiment.

As described above, according to some embodiments of the present invention, as location information of stops is input by an experimental design of a manager in charge of an experiment, information on a flight path of the experimental airplane and pre-stored information on a restricted airspace are provided to the pilot and the experimental scientist in a map form through their terminals. Further, real-time flying position is displayed via a GPS, and information on a real flight path of the experimental airplane is stored so as to be fed back after completion of the experiment.

In addition, according to some embodiments, since the seeding line decision algorithm is applied, real-time weather information exchange with a terrestrial observer can be performed using satellite communications. Thus, a flight path and a seeding path can be displayed and changed by inputting information on a wind direction, a wind velocity, or the like using a simple touch in the experimental airplane. When observation data and numerical weather prediction data in a designated form are input, the data can be displayed on a screen so that an artificial rainfall aviation experiment can be performed by flexibly coping with a meteorological change, and accuracy of the experiment can be also improved, thereby enabling an increase in an experimental effect.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A system for automatically displaying a flight path, a seeding path, and weather data, the system comprising:
    an experimental scientist terminal transmitting weather data;
    a pilot terminal;
    a terrestrial data processing server transmitting wind field observation data concerning a seeding path; and
    a portable data processing server that receives and stores weather data from the experimental scientist terminal and constitutes a flight path and a seeding path of an experimental airplane, and a current location of the experimental airplane, thereby transmitting information on the constituted flight path, seeding path, and current location to the experimental scientist terminal and the pilot terminal, the portable data processing server resetting the stored seeding path by control of the experimental scientist terminal based on wind field observation data concerning the seeding path received from the terrestrial data processing server, and the portable data processing server storing location information of the experimental airplane by control of the experimental scientist terminal,
    wherein the experimental scientist terminal and the pilot terminal display, on a map, the weather data stored in the portable data processing server, and the flight path, the seeding path and the current location of the experimental airplane.

2. The system of claim 1, further comprising a GPS gateway indicating the current location of the experimental airplane, wherein the portable data processing server receives information on the current location of the experimental airplane from the GPS gateway.

3. The system of claim 1, further comprising:
a satellite signal transmitter receiving location information of the experimental airplane from a GPS satellite and transmitting the location information;

a satellite signal receiver receiving the location information of the experimental airplane; and an active Wi-Fi antenna control unit (Active Wifi ACU) controlling rotation of an antenna based on the location information of the experimental airplane received from the satellite signal receiver, wherein the terrestrial data processing server transmits wind field observation data concerning the seeding path via the antenna controlled by the active Wi-Fi antenna control unit.

4. A method for automatically displaying a flight path, a seeding path, and weather data, the method comprising:

storing, by an experimental scientist terminal, weather data in a portable data processing server;

constituting, by the portable data processing server, a flight path and a seeding path of an experimental airplane, and a current location of the experimental airplane on a map;

displaying, by the experimental scientist terminal and the pilot terminal, the weather data, and information on the flight path and the seeding path of the experimental airplane, and the current location of the experimental airplane that are stored in the portable data processing server;

receiving, by the portable data processing server, wind field observation data concerning the seeding path from the terrestrial data processing server;

resetting, by the experimental scientist terminal, the seeding path stored in the portable data processing server based on the wind field observation data received from the portable data processing server; and storing, by the experimental scientist terminal, location information on the experimental airplane in the portable data processing server.

5. The method of claim 4, wherein the receiving of wind field observation data further comprises:

receiving, by a satellite signal transmitter, the location information of the experimental airplane from a GPS satellite, and transmitting the location information;

receiving, by a satellite signal receiver, the location information of the experimental airplane;

controlling, by an active Wi-Fi antenna control unit (Active Wifi ACU), rotation of an antenna based on the location information of the experimental airplane received from the satellite signal receiver; and transmitting, by the terrestrial data processing server, wind field observation data concerning the seeding path using the antenna controlled by the active Wi-Fi antenna control unit.

* * * * *